(12) United States Patent
Scott

(10) Patent No.: US 7,103,388 B2
(45) Date of Patent: Sep. 5, 2006

(54) EXPEDITED COMMUNICATION GRAPHICAL USER INTERFACE SYSTEM AND METHOD

(75) Inventor: Sherryl Lee Lorraine Scott, Toronto (CA)

(73) Assignee: Research in Motion Limited, Waterloo ( * ) Notice: Subject to any disclaimer, the term of this patent is extended or adjusted under 35 U.S.C. 154(b) by 228 days.

(21) Appl. No.: 10/788,055

(22) Filed: Feb. 26, 2004

(65) Prior Publication Data

US 2005/0130642 A1 Jun. 16, 2005

Related U.S. Application Data

(60) Provisional application No. 60/529,969, filed on Dec. 16, 2003.

(51) Int. Cl.
*H04Q 7/20* (2006.01)
(52) U.S. Cl. .................... 455/566; 455/403; 455/550.1
(58) Field of Classification Search ............... 455/566, 455/403, 550.1, 556.2, 557, 418; 345/173, 345/418, 349, 168, 700; 715/505, 530, 501.1, 715/854, 821, 827, 839
See application file for complete search history.

(56) References Cited

U.S. PATENT DOCUMENTS 5,825,362 A * 10/1998 Retter ..................... 715/854

2003/0196166 A1 10/2003 Mercer
2005/0017966 A1* 1/2005 Engl et al. .................. 345/418

FOREIGN PATENT DOCUMENTS

EP          1 233 599 A2      8/2002
WO       WO 01/63392 A2     8/2001

OTHER PUBLICATIONS

Siemens AG: "Siemens SL45 User Guide" dated Dec. 31, 2000, pp. 1-86.
International Search Report For PCT/CA2004/000292 Dated Sep. 3, 2004.

* cited by examiner

*Primary Examiner*—Jean A Gelin
(74) *Attorney, Agent, or Firm*—Robert C. Liang

(57) ABSTRACT

A method for managing expedited communication functions for a mobile device having a processing subsystem, a memory subsystem, a display subsystem, a communication subsystem, and a keyboard subsystem includes displaying a graphical key representation of mobile device keyboard subsystem keys, arranging the graphical keys in similar disposition to the mobile device keyboard subsystem keys, and displaying visual indicia to indicate mobile device keyboard subsystem keys associated with expedited communication functions.

12 Claims, 13 Drawing Sheets

EXPEDITED COMMUNICATION GRAPHICAL USER INTERFACE SYSTEM AND METHOD

This application claims the benefit of priority to United States Provisional Application Ser. No. 60/529,969, filed on Dec. 16, 2003, the disclosure of which is incorporated herein by reference.

This application is related to co-pending U.S. patent application Ser. No. 10/787,785, filed Feb. 26, 2004 entitled "Expedited Communication Key System and Method," and U.S. patent application Ser. No. 10/787,783, filed Feb. 26, 2004, and entitled "Mobile Device Communication Profile System and Method."

BACKGROUND

1. Technical Field

This patent document generally relates to mobile device communication systems and methods, and in particular relates to graphical user interfaces for managing communication functions on a mobile device.

2. Description of the Related Art

A communication function, such as the placing of a telephone call or the sending of an e-mail, is normally initiated by a user of a mobile device by dialing a telephone number or launching an e-mail program and selecting an e-mail address. The mobile device, however, may also be configured to perform expedited communication functions. An expedited communication function is a communication function that is initiated by fewer user input operations than required to initiate the communication function in a normal manner. Each expedited communication function may be associated with a corresponding key on a mobile device keyboard so that the user may activate the expedited communication function by pressing the key.

When associating keys with expedited communication functions, or when reviewing keys associated with expedited communication functions, the user may browse a list of associated keys and unassociated keys on the mobile device display. The entire list of keys that are associated or not associated with expedited communication functions, however, usually cannot be displayed on a single mobile device display screen. Thus, the user must browse through the list, either by scrolling or paging through the list, to determine which keys have been associated with expedited communication functions and which keys are eligible for such association. As a result, the user is unable to quickly discern keys associated with expedited communication functions, and keys that are either eligible or ineligible for such association.

SUMMARY

A method for managing expedited communication functions for a mobile device having a processing subsystem, a memory subsystem, a display subsystem, a communication subsystem, and a keyboard subsystem includes displaying a graphical key representation of mobile device keyboard subsystem keys, arranging the graphical keys in similar disposition to the mobile device keyboard subsystem keys, and displaying visual indicia to indicate mobile device keyboard subsystem keys associated with expedited communication functions.

A mobile device operable to initiate and receive communications over one or more wireless communication networks comprises a processing subsystem, a memory subsystem, a display subsystem, a communication subsystem, and a keyboard subsystem. The processing subsystem is coupled to the memory subsystem, display subsystem, keyboard subsystem and communication subsystem. The processing subsystem is operable to store and retrieve data in the memory subsystem, to execute instructions stored in the memory subsystem, receive input data from the keyboard subsystem, and to cause the communication subsystem to transmit and receive data over the communication network. Additionally, mobile device program code comprising program instructions executable by the processing subsystem is stored in the memory subsystem. Upon execution, the mobile device program code causes the mobile device to display a graphical user interface to facilitate the processing of expedited communication data. The graphical user interface includes a graphical key representation of the mobile device keyboard subsystem keys. The graphical keys are arranged in similar disposition to the mobile device keyboard subsystem keys. The graphical user interface also includes visual indicia to indicate mobile device keyboard subsystem keys associated with expedited communication functions.

DETAILED DESCRIPTION

Figure 1:
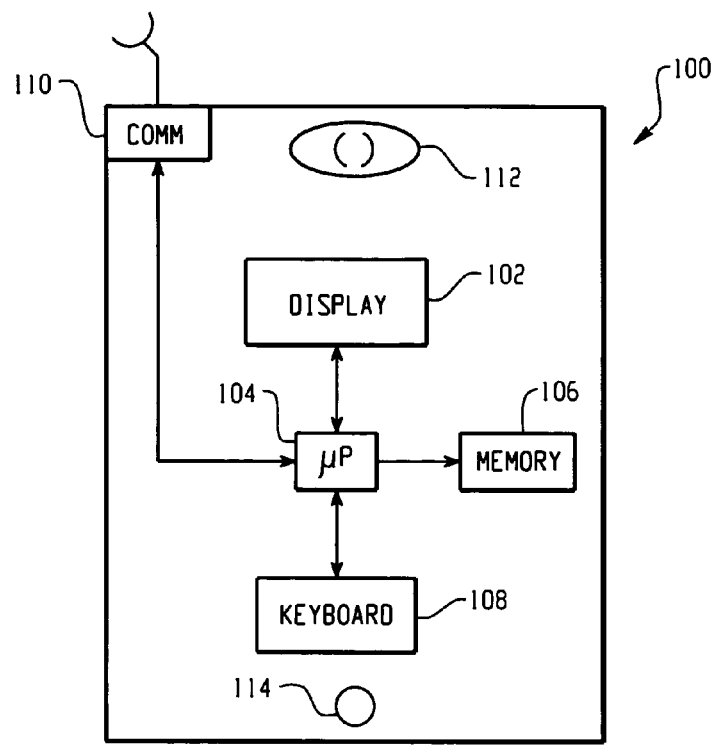
FIG. 1 is a block diagram of a mobile device.

FIG. 1 is a block diagram of a mobile device 100. The mobile device 100 may comprise a display subsystem 102, a processing subsystem 104, a memory subsystem 106, a keyboard subsystem 108, and a communication subsystem 110. The mobile device 100 may be any mobile communication device adapted to operate within a wireless communication network and is preferably a two-way communication device. An audio subsystem comprising a speaker 112 and a microphone 114 may also be included if the mobile device 100 supports voice communication functions. A more detailed description of the mobile device 100 and an exemplary operating environment for the mobile device 100 is described with respect to FIGS. 19 and 20 below.

Depending on the functionality provided by the mobile device 100, the mobile device 100 may be referred to as a data messaging device, a two-way pager, a cellular telephone with data messaging capabilities, a wireless Internet appliance or a data communication device (with or without telephony capabilities). Data communication functions, such as e-mail, instant messaging, paging, and the like, are primarily facilitated by the display subsystem 102, the keyboard subsystem 108, and the communication subsystem 110, which provide the primary user interface and communication capability for composing, reading and replying to data communications. Voice communication functions are further facilitated by the audio subsystem comprising the speaker 112 and the microphone 114.

The memory subsystem 106 stores mobile device program code comprising program instructions that are executable by the processing subsystem 104. The mobile device 100 is thus a programmable device that may be programmed to carry out multiple functions upon execution of the mobile device program code by the processing subsystem 104. The memory subsystem 106 may also store contact data comprising contact names and associated communication contact data, such as telephone numbers and e-mail addresses. An address book application is an example of one such application and storage program that may store contact data in the memory subsystem 106.

A communication function, such as the placing of a telephone call or the sending of an e-mail, is normally initiated on the mobile device 100 by dialing a telephone number or launching an e-mail program and selecting an e-mail address. The mobile device 100, however, may also be configured to perform expedited communication functions. An expedited communication function is a communication function that is initiated by fewer user input operations than required to initiate the communication function in a normal manner.

Speed-dialing is an example of one such expedited voice communication function. A speed-dial operation may be facilitated by associating a telephone number with a single key. Activation of the key causes the mobile device 100 to establish a telephone call to the associated telephone number. Likewise, associating an e-mail address or other electronic address with a single key may facilitate an expedited data communication function. Activation of the key causes the mobile device 100 to send a pre-defined data message to the associated electronic address, or alternatively launches a program or routine that automatically addresses a data message to the associated electronic address and launches an editing program or routine so that the user may compose the body of the data message.

Figure 2:
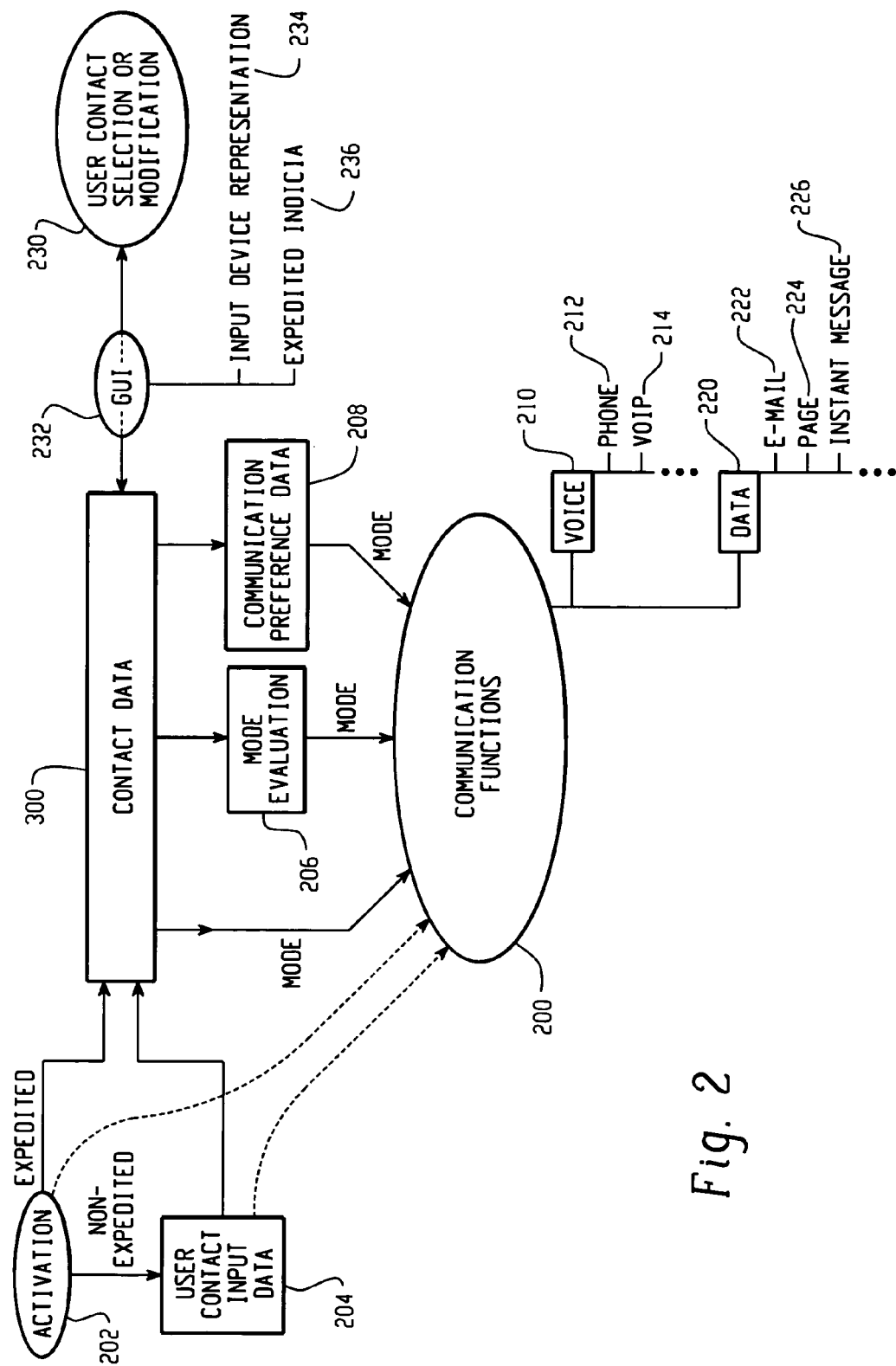
FIG. 2 is a block diagram of a communication management apparatus and method that may be implemented in the mobile device of FIG. 1.

FIG. 2 is a block diagram illustration of a communication management apparatus and method that may be implemented in the mobile device of FIG. 1. The mobile device 100 may be operable to carry out one or more communication functions 200. The communication functions may comprise voice functions 210, such as phone communications 212, voice over IP (VoIP) communications 214, and the like, and/or data functions 220, such as e-mail communications 222, paging communications 224, instant messaging communications 226, and the like.

An activation event 202 will invoke a communication function. If the activation event invokes a non-expedited communication function, user contact input data 204 is required. The user contact input data 204 may, for example, cause an application program, such as an address book, to launch so that the user may browse the contact data 300 stored in the mobile device 100 and select the appropriate communication contact data, such as a phone number or e-mail address. Alternatively, the user may manually enter the phone number or e-mail address, thereby directly invoking a corresponding communication function.

If the activation event 202 invokes an expedited communication function, however, then the contact data 300 may be directly accessed to automatically obtain the corresponding communication contact data and to automatically initiate the corresponding communication mode associated with the communication contact data. Alternatively, if the communication contact data is stored in a separate memory store from the contact data 300 and is automatically entered upon the activation event 202, e.g., a separate speed dial data set in which are stored speed dial numbers, then the corresponding communication function may be automatically initiated.

In another embodiment, once the communication contact data for either an expedited or non-expedited communication function is obtained, a mode evaluation routine 206 determines if the communication mode associated with the communication contact data is available. If the communication mode associated with the communication contact data is available, then the corresponding communication function is executed. If the communication mode associated with the communication contact data is not available, however, then the mobile device 100 determines if an alternate communication mode associated with the communication contact data is available. If the alternate communication mode associated with the communication contact data is available, then the corresponding alternate communication function is executed.

For example, if a speed-dial function is invoked, the corresponding communication contact data is a phone number, and the corresponding communication mode is the phone communication 212. The mode evaluation routine 206 determines if voice coverage is available. If voice coverage is available, a telephone call is placed to the phone number. If voice coverage is not available, however, then the mode evaluation routine 206 determines if data coverage is available. If data coverage is available, then the mode evaluation routine 206 may search the contact data 300 for alternate communication contact data associated with the phone number, e.g., an e-mail address from an address book entry corresponding to the phone number.

If there is an e-mail address entry in the contact data 300, then an e-mail message to be sent to the e-mail address is created. The e-mail message may be a predefined message, such as "I am attempting to call you at phone number (XXX)

XXX-XXXX but I am presently out of voice coverage. I will try again soon." The phone number (XXX) XXX-XXXX may be the phone number associated with the speed dial function. Alternatively, the body of the e-mail message may be composed by the user and sent manually.

In another embodiment, communication preference data 208 associated with the contact data 300 may be referenced to determine a preferred communication mode to contact the intended recipient. The communication preference data 208 defines preferred communication modes for communicating with the contact associated with the communication contact data.

In one embodiment, the communication preference data 208 comprises a rule set based on time. For example, the rule set may specify that during work days a phone communication to the contact's work phone number be used as a preferred communication. Additionally, during evenings and weekends, the rule set may specify that an e-mail communication to the contact's work e-mail address be used as a preferred communication.

In another embodiment, the communication preference data 208 comprises a rule set based on contact status. A contact status may indicate the relationship the contact has with mobile device user, e.g., business, personal, services, etc. If the contact status is personal, then a default personal communication profile may be used. A default personal communication profile may comprise a rule set that specifies that during workdays a phone communication to the contact's work phone number be used as a preferred communication, and during weeknights and weekends a phone communication to the contact's home phone number be used as a preferred communication. The default personal communication profile may also be modified by the user of the mobile device 100.

If the contact status is professional, then a default professional communication profile may be used. A default professional communication profile may comprise a rule set that specifies that during workdays a phone communication to the contact's work phone number be used as a preferred communication, and during weeknights and weekends an e-mail communication to the contact's work e-mail be used as a preferred communication. The default professional communication profile may also be modified by the user of the mobile device 100.

In another embodiment, the management of expedited communication functions is facilitated by a graphical user interface (GUI). Typically, a key is associated with communication contact data or a record in the contact data 300 to enable an expedited communication function. For example, a selection of a contact by a user or a contact modification event 230 may invoke a GUI 232 that graphically represents the association of expedited communication functions to an input device, such as a keyboard. The GUI 232 may comprise an input device representation 234 and visual indicia 236 that indicates the association or non-association of expedited communication functions with the input device.

For example, if the expedited communication functions comprise one-key activated speed dial communications or one-key activated e-mail communications associated with keys on the keyboard subsystem 108, then the GUI 232 may comprise a graphical key representation of the mobile device keyboard subsystem 108 keys. If the keyboard subsystem 108 on the mobile device 100 comprises a physical keyboard, then the graphical keys may be arranged in similar disposition to the mobile device keyboard subsystem 108 keys. Visual indicia, such as highlighted graphical keys, indicates keyboard subsystem 108 keys associated with expedited communication functions.

If the keyboard on the mobile device 100 is a touch sensitive keyboard, such as a virtual keyboard rendered on the mobile device display 100, then only the visual indicia need be rendered to indicate keyboard subsystem 108 keys associated with expedited communication functions.

Figure 3:
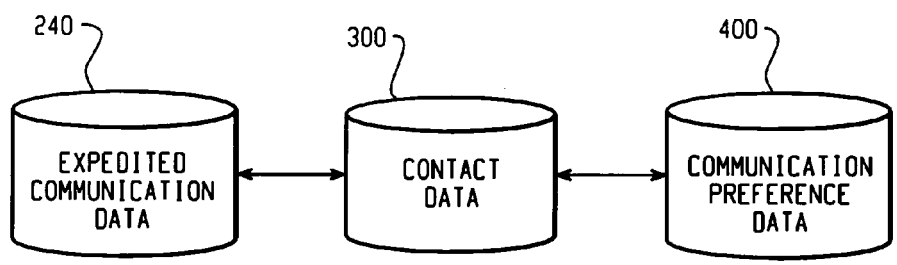
FIG. 3 is a block diagram of the association of expedited communication data, contact data, and communication preference data.

FIG. 3 is a block diagram illustration of the association of expedited communication data 240, contact data 300, and communication preference data 400. Although the illustration depicts three separate database structures, the expedited communication data 240, contact data 300, and communication preference data 400 may be stored in a single database structure, or distributed over additional database structures. Furthermore, database structures need not necessarily be used to associate the expedited communication data 240, contact data 300, and communication preference data 400. Any type of file and/or data association method or structure may be used to associate the expedited communication data 240, contact data 300, and communication preference data 400.

The expedited communication data 240 may comprise data that specifies a particular expedited communication function. The contact data 300 stores communication contact data, such as phone numbers and electronic addresses, for particular contacts. Typically, the contact data 300 may be conveniently browsed and/or searched by an application program, such as an address book application. The communication preference data 400 stores data specifying a preferred mode of communicating with a contact, e.g., a phone call to a work phone number, a phone call to a home phone number, an e-mail to a work e-mail address, a page to a pager number, and the like.

A data record stored in the expedited communication data 240 may associate a key entry with particular communication contact data stored in the contact data 300, e.g., the keyboard key "H" may be associated with the user's home telephone number, or the user's home e-mail address. Pressing the associated key will cause the mobile device to invoke the corresponding communication function associated with the communication contact data, e.g., dialing the user's home phone number or preparing an e-mail message to the user's home e-mail address.

The communication preference data 400 specifies the preferred communication mode for an associated contact. The preference may be based on a rule set or status of the intended recipient, as previously described with respect to FIG. 2 above. Furthermore, the communication preference data 400 need not be associated with the expedited communication data 240. For example, the communication preference data 400 may specify the preferred mode of communication for all communications to the contact associated with the contact data 300. Thus, if the user is initiating a communication in a non-expedited manner, such as manually selecting a contact from an address book, then the communication preference data 400 may determine which communication mode is used to communicate with the contact associated with the selected contact data 300. The selection of the communication mode by the communication preference data 400 may be selectively disabled by the user, such as by checking a selection option in the address book application.

Alternatively, the communication preference data 400 may specify the preferred mode of communication for specific communications to the contact associated with the contact data 300. For example, only the communication modes for expedited communication functions may be determined by the communication preference data 400, and communication modes for non-expedited communications may be determined by the user. The selection of the communication modes by the communication preference data 400 for expedited communications may be selectively disabled by the user, such as by checking a selection option in a "speed dial" menu option.

Figure 4:
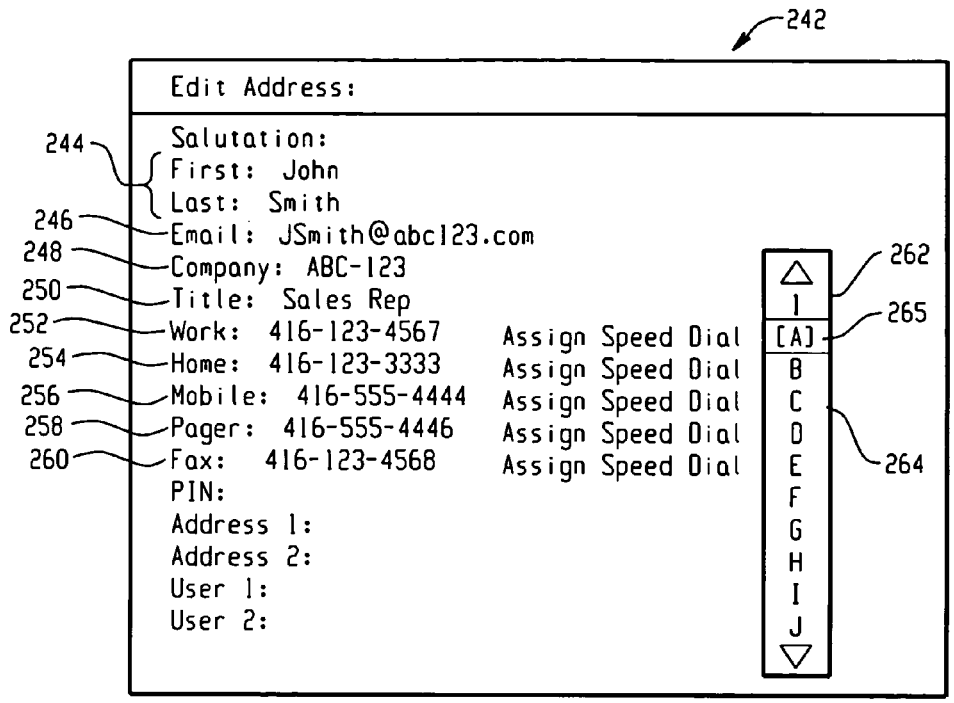
FIG. 4 is an illustration of a first display environment.

FIG. 4 is an illustration of a first display environment 242. The first display environment 242 is an example display for an entry in an address book application and displays a data record in the contact data 300. The contact data 300 data record may include a plurality of fields, such as contact name fields 244, an e-mail address field 246, a company name field 248, a title field 250, a work phone number field 252, a home phone number field 254, a mobile number field 256, a pager number field 258, and fax number field 260. The e-mail address field 246, work phone number field 252, home phone number field 254, mobile number field 256, pager number field 258, and fax number field 260 each store associated communication contact data, such as electronic addresses or phone numbers.

In the embodiment shown in FIG. 4, a key assignment window 262 facilitates the association of keyboard keys to selected phone, pager and fax communication contact data. In another embodiment, the key assignment window 262 may be extended to facilitate the association of keyboard keys to e-mail communication contact data. The association of a key with communication contact data is used to facilitate expedited communication functions for the associated communication contact data.

In this particular embodiment, the key assignment window 262 includes a scrolling key list 264 and a selection bracket 265. By scrolling the key list 264, different keyboard keys may be selected for association with the corresponding communication contact data. As shown in FIG. 4, the keyboard key "A" has been selected for association with the work phone number field 252, which in turn will associate the key "A" with the work phone number (416) 123-4567 stored in the work phone number field 252. The numeral "1" is bolded, indicating that the numeral has been previously associated with other communication contact data. The key list 264 may be scrolled up and down to determine which keys are associated with communication contact data.

Figure 5:
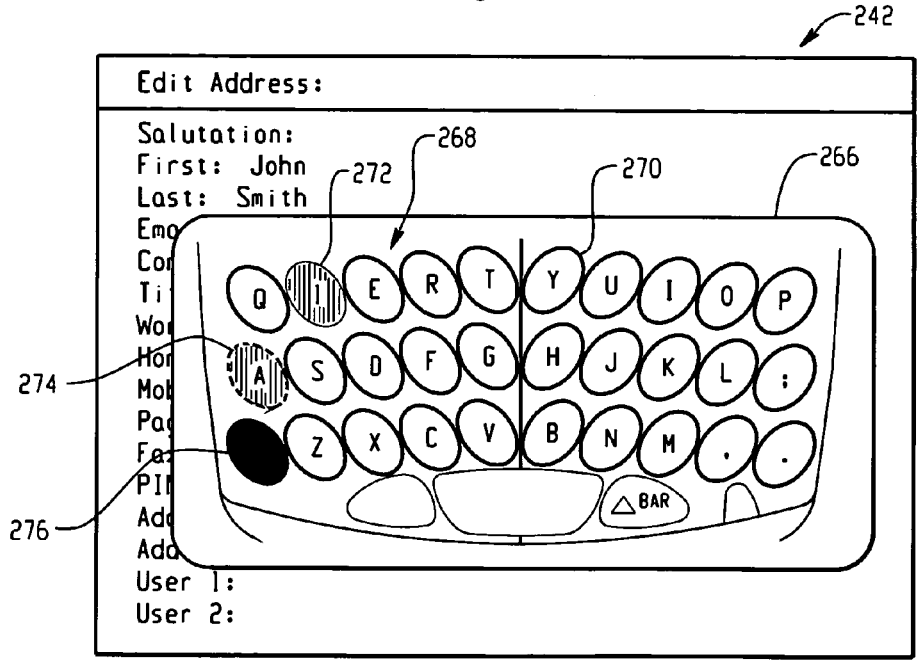
FIG. 5 is an illustration of the first display environment including a graphical key representation.

FIG. 5 is an illustration of the first display environment 242 including a graphical key representation 266. The graphical key representation 266 comprises a plurality of graphical keys 268. If the mobile device 100 includes a physical keyboard, the plurality of graphical keys may be arranged in similar disposition to the mobile device 100 keyboard keys. The graphical key representation 266 includes visual indicia to indicate mobile device keyboard subsystem 108 keys associated with expedited communication functions. In the embodiment shown in FIG. 5, the visual indicia includes a bolded key outline 270 for keys 268 not associated with expedited communication functions. Keys that are associated with expedited communication functions are illustrated as shaded keys, such as shaded key 272. Keys that are presently selected to be associated with an expedited communication function are shaded and outlined in a bold dotted line, such as selected key 274. Finally, keys that are not available to be associated with expedited communication functions have no detail, such as ineligible key 276.

The graphical key representation 266 thus provides the user with a GUI from which the user may quickly discern keys associated with expedited communication functions, and keys that are either eligible or ineligible for such association. The selected key 274 may be associated with an expedited communication function by a user input. One such user input, for example, may comprise pressing the key in the keyboard subsystem 108 that corresponds to the selected key 274 in the graphical key representation 266. If the mobile device 100 does not have a physical keyboard, but instead has a touch sensitive display keypad, then the user input may comprise touching the screen region on which the selected key 274 is displayed. Other user inputs may also be used to associate the selected key 274 with the expedited communication function.

Figure 6:
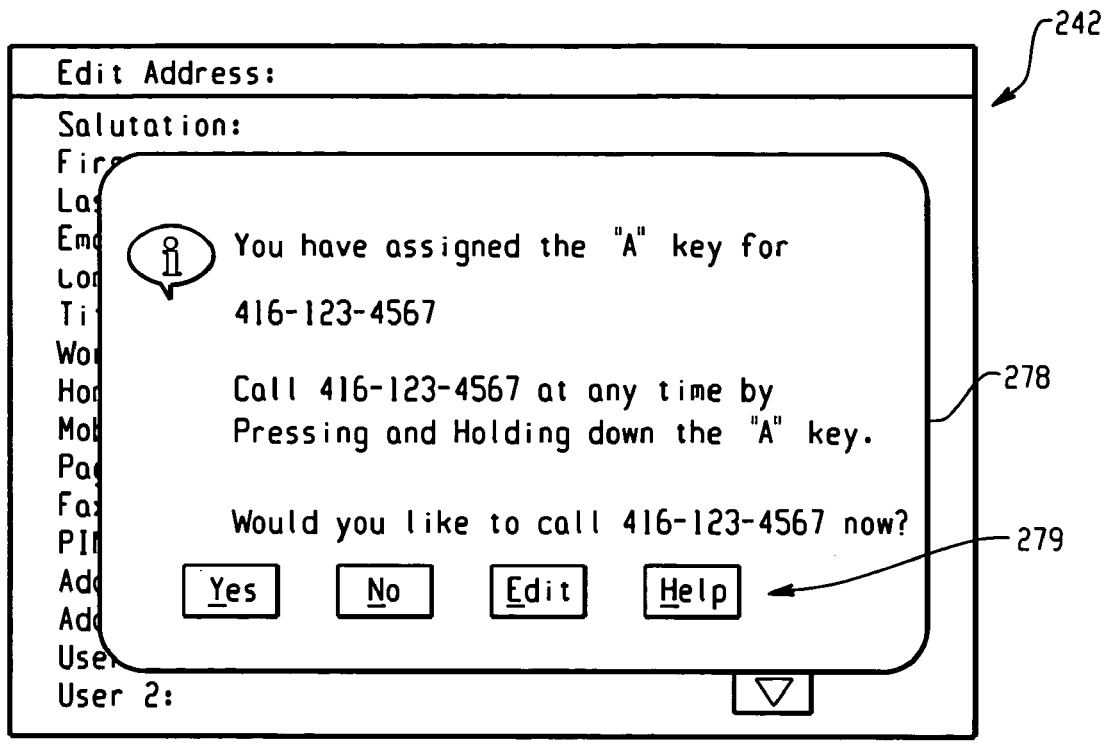
FIG. 6 is an illustration of the first display environment including a user input dialog.

FIG. 6 is an illustration of the first display environment 242 including a user input dialog 278. The user input dialog 278 is displayed upon association of the graphical key with the expedited communication function. A plurality of selection buttons 279 provide the user with selectable options, such as accepting a proposed action, rejecting a proposed action, editing the association of the graphical key with the expedited communication function, or accessing a help menu.

In another embodiment, if the keyboard subsystem key corresponding to the selected graphical key is associated with an expedited communication function, the user input dialog 278 is displayed upon selection of the graphical key. In this embodiment, the associated expedited communication data is displayed. For example, if the keyboard subsystem key corresponding to the graphical key "H" is associated with a speed dial function for a contact's home phone number stored in the home phone number field 254, then selection of the graphical key "H" will display the associated home phone number (416) 123-3333. Likewise, if the keyboard subsystem key corresponding to the graphical key "E" is associated with an e-mail function for a contact's e-mail address stored in the e-mail address field 246, then selection of the graphical key "E" will display the associated e-mail address "jsmith@abc123.com."

Figure 7:
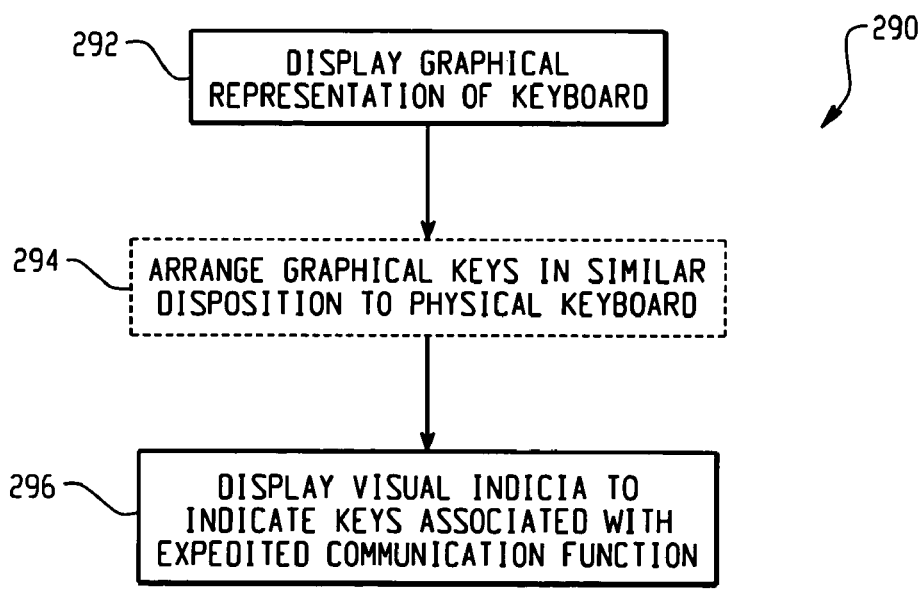
FIG. 7 is a flow diagram of a process for displaying a graphical key representation of keys associated with expedited communication functions.

FIG. 7 is a flow diagram 290 of a process for displaying a graphical key representation of keys associated with expedited communication functions. Step 292 displays a graphical key representation of the mobile device keyboard. If the mobile device does not have a physical keyboard, e.g., a touch sensitive keyboard is displayed on a touch sensitive display, then the touch sensitive keyboard is displayed. Alternatively, if the mobile device does have a physical keyboard, then an additional step 294 arranges the graphical keys in similar disposition to the physical keyboard. Finally, step 296 displays visual indicia to indicate keys associated with expedited communication functions. The visual indicia allows the user to readily discern keys associated with expedited communication functions, and keys that are either eligible or ineligible for such association.

Figure 8:
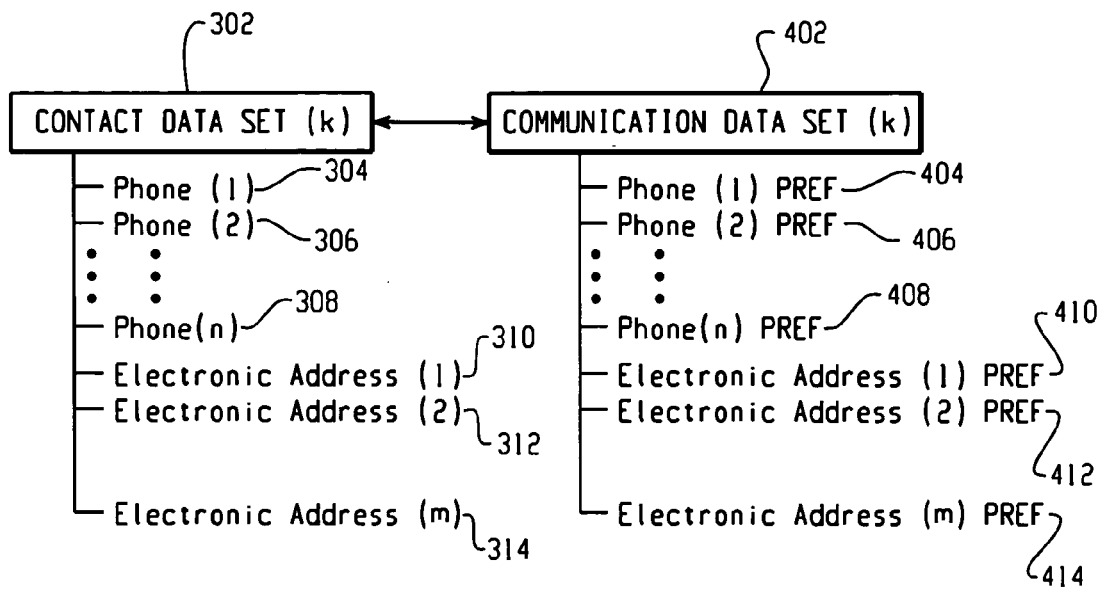
FIG. 8 is a block diagram of the association of a contact data set record and a communication preference data set record.

In another embodiment, communication preference data 400 specifies the preferred communication mode for an associated contact. FIG. 8 is a block diagram illustration of the association of a contact data set record 302 and a communication preference data set record 402. The contact data set record 302 has one or more associated communication contact data for a particular contact associated with the contact data set record 302, and the communication preference data set record 302 defines communication preferences for communicating with the contact. Upon input of a command to the mobile device 100 to initiate a communication to the contact associated with the contact data set record 302, the mobile device 100 executes the communication according to the preferred communication mode defined by the communication preference data set record 402 associated with the corresponding contact data set record 302.

In this embodiment, an example contact data set record 302 comprises first, second, and n-phone contact data 304, 306, and 308, and first, second and n-electronic contact data 310, 312, and 314. Likewise, an example communication preference data record 402 comprises first, second and n-phone contact preference data 404, 406 and 408, and first, second and n-electronic contact preference data 410, 412 and 414.

The contact preference data 404, 406, 408, 410, 412 and 414 may collectively define a set of selection rules based on a section variable, such as time. For example, assume the first, second, and n-phone contact data 304, 306, and 308 comprise a home phone number, a work phone number, and a work fax number, respectively, and the first, second and n-electronic contact data 310, 312 and 314 comprise a work e-mail address, a personal e-mail address, and a pager number, respectively. The first, second and n-phone contact preference data 404, 406 and 408, and first, second and n-electronic contact preference data 410, 412 and 414 may specify preferred communication times for each communication mode associated with each particular contact data, as illustrated in Table 1 below:

TABLE 1

| Contact Data (k) | Preference Data (TIME) |
|---|---|
| (216) 555-1234 | 6:00 PM–10:00 PM (M–F) |
|  | 8:00 AM–10:00 PM (WKN) |
| (216) 555-2235 | 8:00 AM–6:00 PM (M–F) |
| (216) 555-2236 | NEVER |
| joe@work.com | 10:00 PM–8:00 AM (M–F) |
| joe@home.org | ALL OTHER TIMES |
| (216) 555-2237 | NEVER |

Based on the communication preference data of Table 1, initiation of a communication to the contact associated with contact data record (k) will result in a phone call to either the contact's home phone number or the contact's work phone number, or an e-mail message to the contact's work e-mail address or the contact's home e-mail address, depending on the time the communication is initiated. The communication will never be a fax to the contact's work fax number or a page to the contact's pager number. The contact preference data may be specified and modified by the user of the mobile device 100.

The selection of the communication mode by the communication preference data 400 may be selectively enabled or disabled by the user, such as by checking a selection option in the address book application. For example, the user may disable automatic selection of the communication mode for all communications, or alternatively may enable automatic selection of the communication mode for particular communications, such as expedited communications or non-expedited communications.

Figure 9:
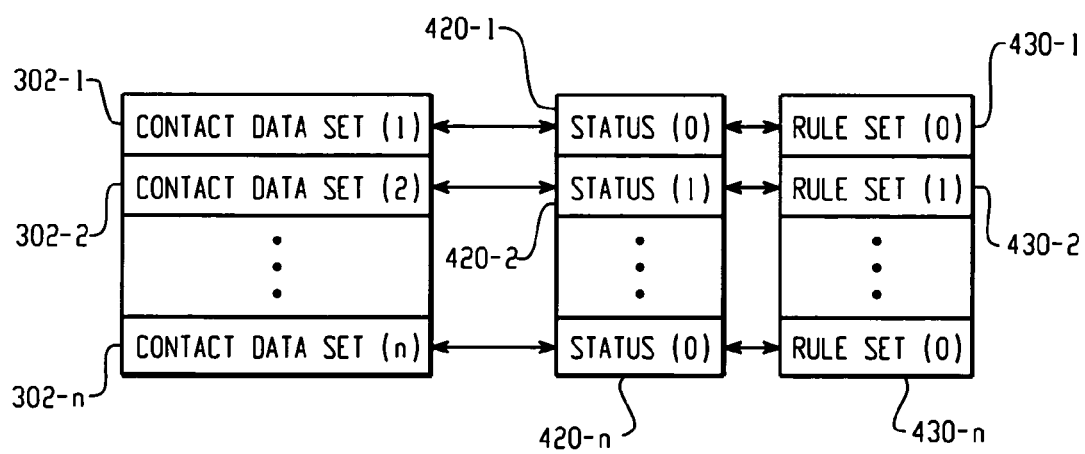
FIG. 9 is a block diagram of the association of contact data set records, status records, and rule sets.

In another embodiment, the communication preference data 400 comprises a rule set based on contact status. FIG. 9 is a block diagram illustrating the association of contact data set records 302, status records 420, and rule sets 430. Each contact data set record 302-1, 302-2, 302-*n* may comprise contact data similar to the contact data described with reference to FIG. 8. Each status record 420-1, 420-2, 420-*n* comprises status data identifying a contact status of an associated contact. A contact status may indicate the relationship the contact has with mobile device user, e.g., business, personal, services, etc. Each particular contact status may be further associated with a default rule set 430-1, 430-2, and 430-*n*. Each default rule set 430 may comprise contact preference data similar to the contact preference data described with reference to FIG. 8.

For example, if the contact status is personal, then a default personal communication profile may be used. A default personal communication profile may comprise a rule set that specifies that during workdays a phone communication to the contact's work phone number be used as a preferred communication, and during weeknights and weekends a phone communication to the contact's home phone number be used as a preferred communication. The default personal communication profile may also be modified by the user of the mobile device 100.

Likewise, if the contact status is professional, then a default professional communication profile may be used. A default professional communication profile may comprise a rule set that specifies that during workdays a phone communication to the contact's work phone number be used as a preferred communication, and during weeknights and weekends an e-mail communication to the contact's work e-mail be used as a preferred communication. The default professional communication profile may also be modified by the user of the mobile device 100.

Other default communication profiles may be used for other status types, e.g., parent, child, attorney, doctor, pediatrician, and so on. Furthermore, the user of the mobile device 100 may define particular status types and attendant default communication profiles for the user-defined status types. For example, the user of the mobile device 100 may create a "doctor" status type upon beginning treatment of a medical condition, and may configure a doctor communication profile so that the doctor's phone number is called during regular business hours, and the doctor's after-hours phone number is called outside of normal business hours.

In another embodiment, the communication preference data 400 may facilitate a preferred communication menu for selecting one of the preferred communication modes. For example, if a user of the mobile device 100 initiates a communication to a contact, and a phone call to the contact's work phone number is placed, it is possible that the contact may not be available to answer the phone. If the user does not desire to leave a voice mail message, the user may terminate the phone call communication, and select another preferred communication mode from a preferred communication menu. The communication modes available on the preferred communication menu correspond to the preferred communication modes defined by the communication preference data 400. Thus, rather than having to search for the contact in an address book application, and then search for the appropriate communication contact data once the contact is found, the user of the mobile device 100 may conveniently access the preferred communication modes for that contact and invoke a corresponding communication mode via the preferred communication menu.

Figure 10:
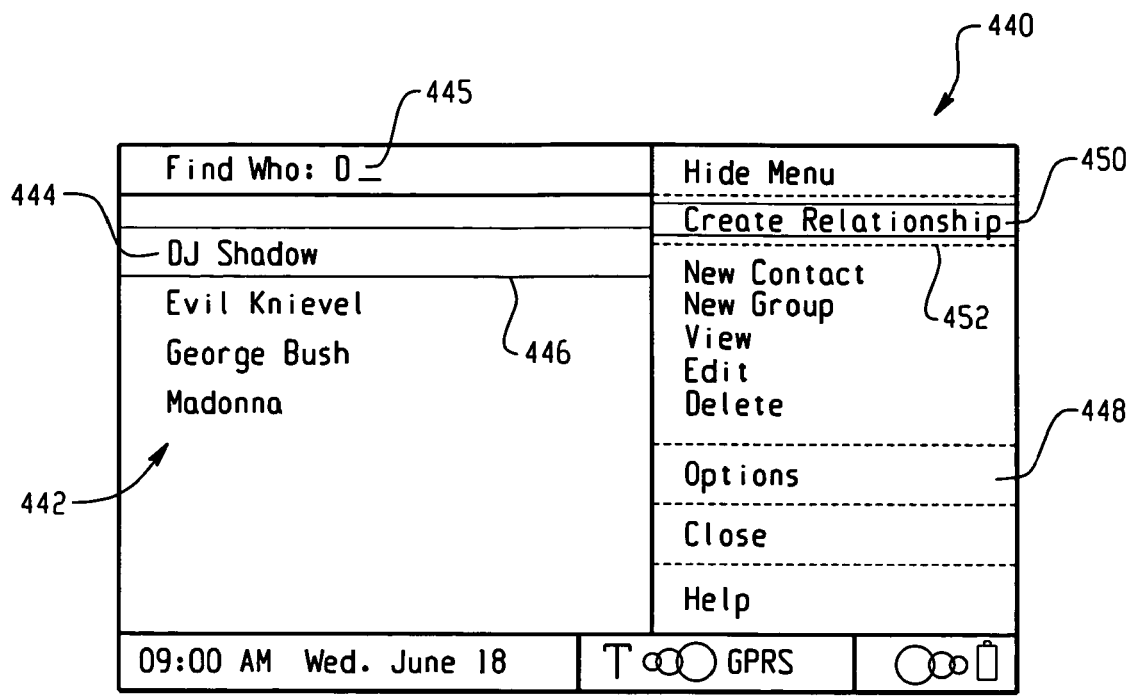
FIG. 10 is an illustration of a first contact display environment.

Set-up and management of the communication preference data 400 may be facilitated by a menu-driven interface in an application program operable to browse contact information, such as an address book application program. FIG. 10 is an illustration of a first contact display environment 440 in an address book application program. The first contact display environment 440 includes a contact list 442 that lists contact entries stored in the contact data 300. As shown, the entry for the contact "DJ Shadow" 444 has been selected, as indicated by the selection bar 446. The entry "DJ Shadow" may be selected manually by the user, or may be selected as the result of a search executed by a search command 445. A contact menu 448 comprises a list of selectable menu options. The menu option "Create Relationship" 450, which has been selected as indicated by selection bar 452, provides the user a display environment to associate communication preference data with the selected contact.

Figure 11:
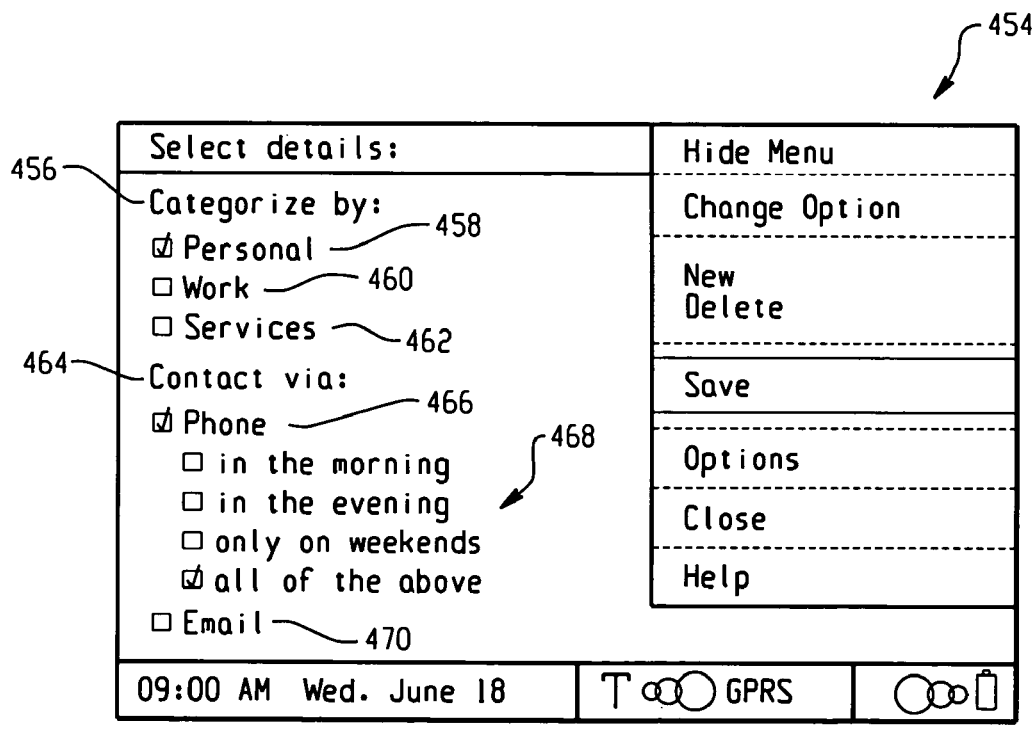
FIG. 11 is an illustration of a first contact relationship display environment.

FIG. 11 is an illustration of a first contact relationship display environment 454. The first contact relationship display environment 454 is displayed upon selection of the "Create Relationship" menu option 450 in the first contact display environment 440. In the embodiment shown, the selected contact 444 may be categorized by a status category 456. Three status categories included a personal status 458, a work status 460, and a services status 462.

Additionally, communication preference data 464 includes a rule set comprising phone preference data 466 and corresponding contact time data 468, and e-mail preference data 470. As shown, the contact data for the selected contact 444 comprises corresponding phone communication data and e-mail communication data. The contact time data 468 for the phone preference data 466 define a default personal communication profile that specifies the contact is to be contacted via a phone call at all times. The user may adjust the communication preference data 464 accordingly.

If the contact data for the selected contact 444 included additional phone contact data and additional electronic address contact data, then the relationship display environment 454 may list additional communication preference data. For example, if two phone numbers corresponding to a work phone and a home phone number and two electronic addresses corresponding to a work e-mail address and a personal e-mail address are stored in the corresponding contact data for the selected contact 444, then the relationship display environment 454 may display four separate communication preferences, e.g., rule sets for contacting the contact via a work phone, a home phone, a work e-mail, and a personal e-mail. Thus, for each type of communication contact data stored for a corresponding contact, the user may define particular rules for preferred communication modes for executing a communication to the contact.

Figure 12:
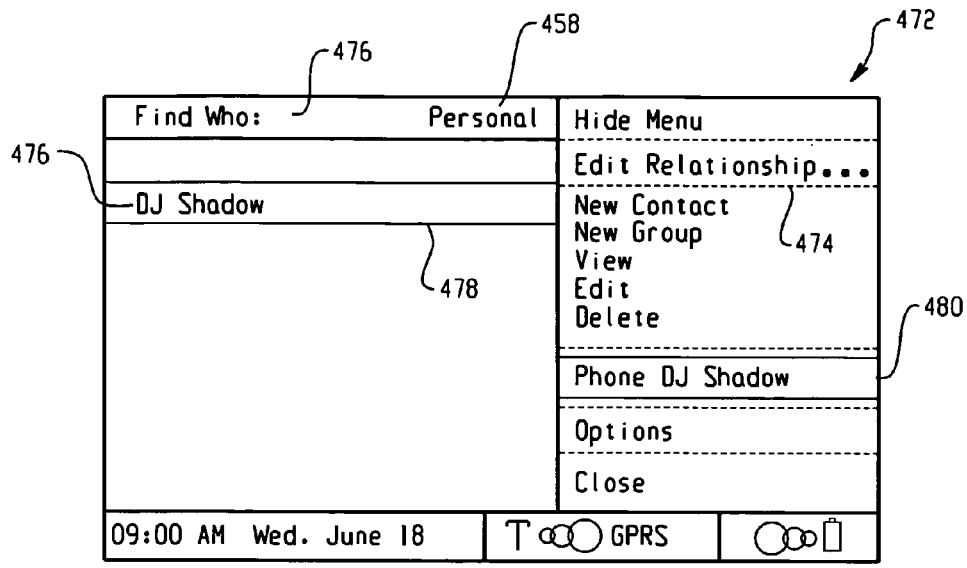
FIG. 12 is an illustration of a second contact display environment.

FIG. 12 is an illustration of a second contact display environment 472. The second contact display environment 472 is displayed after saving the communication preference data in the first relationship display environment 454, or upon selecting a contact with associated communication preference data. In the embodiment shown, the selected contact 444 is categorized according to a personal status 458. The contact 444 has been selected as the result of a search for contacts of a personal status executed by a search command 476. Because the contact 444 has associated communication preference data, the "Create Relationship" menu option 450 has been replaced by an "Edit Relationship" menu option 474, the selection of which will display a second contact relationship display environment 484, which is described below with respect to FIG. 13.

A communication menu option 480 is also displayed in the second contact display environment 472. In the embodiment shown, the communication menu option 480 indicates the preferred communication mode defined by the communication preference data. In this example, the communication menu option 480 reads "Phone DJ Shadow" because the communication preference data defines a phone call as the preferred communication mode. However, if the communication preference data further defined another preferred communication mode for a particular time, e.g., an e-mail communication between the hours of 9:00 PM and 7:00 AM, then the communication menu option 480 would read "E-mail DJ Shadow" between the hours of 9:00 PM and 7:00 AM. Accordingly, in this embodiment, the communication menu option 480 is configured to provide indicia of the presently preferred communication mode for executing a communication to the selected contact.

In another embodiment, the communication menu option 480 may be configured to provide more detailed indicia of the presently preferred communication mode. For example, if the communication preference defines rule sets for communicating with the contact via a work phone number, a home phone number, a work e-mail address, and a personal e-mail address, then the communication menu option 480 may read "Phone(W) DJ Shadow," "Phone(H) DJ Shadow", "E-mail(W) DJ Shadow," and "E-Mail(P) DJ Shadow," respectively, depending on the presently preferred communication mode.

Figure 13:
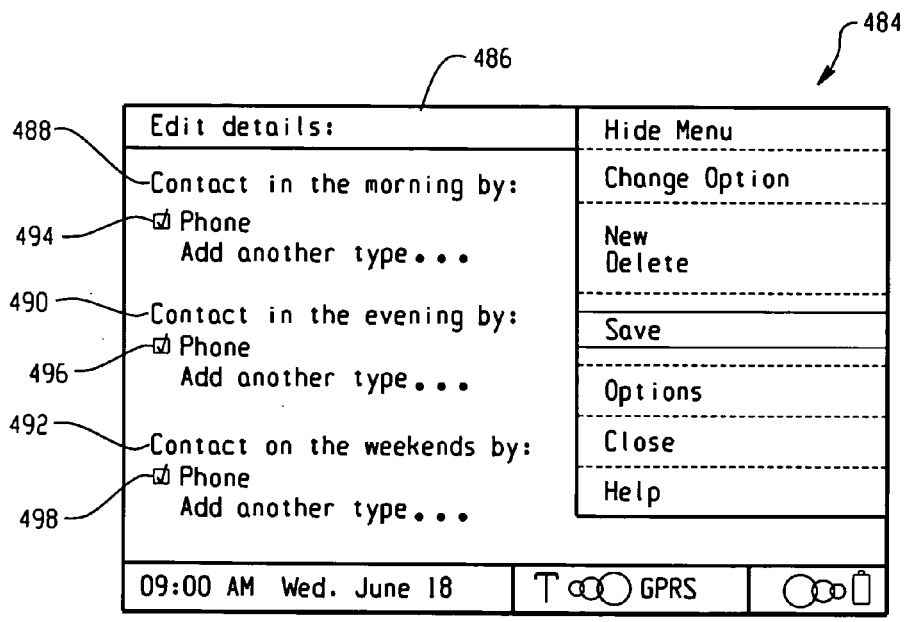
FIG. 13 is an illustration of a second contact relationship display environment.

FIG. 13 is an illustration of the second contact relationship display environment 484. The second contact relationship display environment 484 is displayed upon selection of the "Edit Relationship" menu option 474, and facilitates the editing of communication preference data associated with a selected contact. In the embodiment shown, the second contact relationship display environment 484 comprises an edit menu 486 that includes first, second and third time preferences 488, 490, and 492, and corresponding first, second and third communication contact preferences 494, 496, and 498. As shown, the preferred communication modes selected for morning, evening and weekends is a phone communication. Other communication modes may be selected by the user as desired.

While the second contact relationship display environment 484 only shows morning, evening and weekend time periods, additional time periods may be displayed or defined by the user. For example, a user of the mobile device 100 may define a more detailed communication profile comprising communication preference data that selects as a preferred communication mode a contact's cell phone number during morning and evening commute times and during lunch, the contact's work phone number during the remaining business hours, and the contact's home phone number during all other times.

Figure 14:
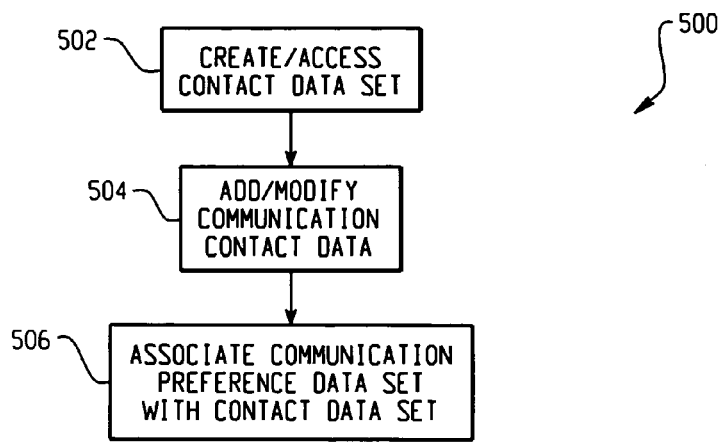
FIG. 14 is a flow diagram of a process for associating preferred communication modes with communication contact data.

FIG. 14 is a flow diagram 500 of a process for associating preferred communication modes with communication contact data. Step 502 creates or accesses a contact data set. The contact data set may be created when a user stores new contact data in the mobile device memory, or may be accessed when the user accesses a stored contact data set, such as selecting a contact in an address book application.

Step 504 adds data to or modifies the communication contact data set. The communication contact data is typically added to when the user adds new communication contact data to the contact data set stored in mobile device memory. For example, the user may receive a new cell phone number for a selected contact in an e-mail from the contact, and then store the cell phone number as a new communication contact data entry in the contact's corresponding contact data. Likewise, the communication contact data is typically modified when the user updates communication contact data stored in mobile device memory. For example, the user may receive an updated cell phone number for a selected contact in an e-mail from the contact, and then update the cell phone communication contact data entry in the contact's corresponding contact data.

Step 506 associates a communication preference data set with the contact data set. The communication preference data set defines preferred communication modes based on the communication contact data for communicating with the contact. The communication preference data set and the association of the communication preference data set may be as described with respect to FIGS. 2–13 above.

In another embodiment, the communication preference data set may be received in a contact data set sent from a contact, such as when a contact sends a file that includes his or her contact data, e.g., an electronic business card. The communication preference data may then be automatically stored when the contact data set is stored in the mobile device.

Figure 15:
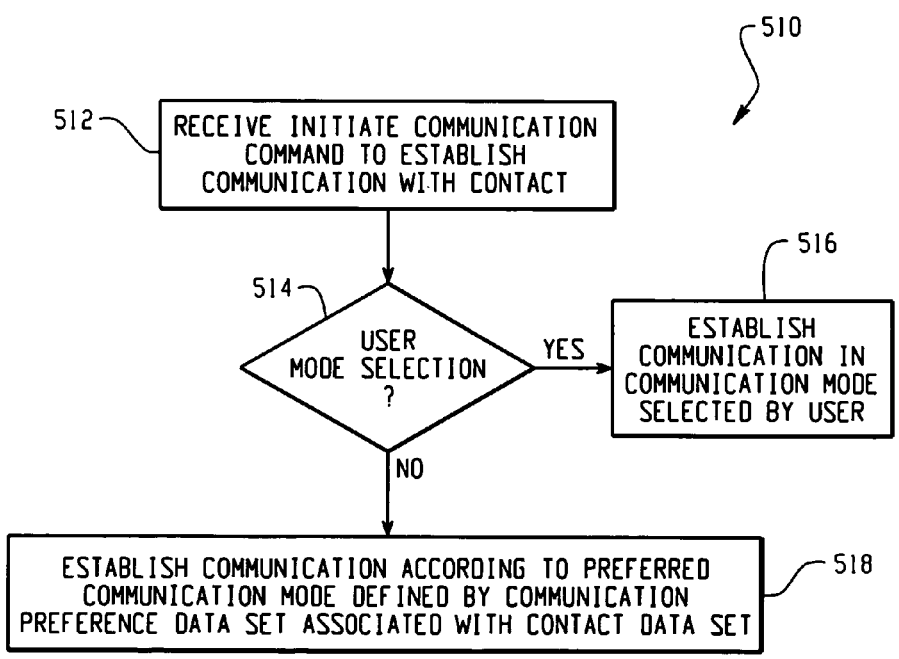
FIG. 15 is a flow diagram of a process for initiating a preferred communication.

FIG. 15 is a flow diagram 510 illustrating a process for initiating a preferred communication. In step 512, an initiate communication command is received to establish a communication with the contact. The initiate communication command may be in response to either the initiation of an expedited communication function, such as a speed dial activation, or a non-expedited communication function, such as the manual entry of a phone number.

Step 514 determines if the user has specified a particular communication mode. For example, the user may have configured the mobile communication device to establish the communication via a preferred communication mode for expedited communication functions only, and to otherwise establish the communication via the communication mode selected by the user for all other communication functions.

If the user has specified a particular communication mode, such as by manually entering a phone number, then step 516 establishes the communication according to the communication mode selected by the user. If, however, the user has not specified a particular communication mode, then step 518 establishes the communication according to the preferred communication mode defined by the communication preference data set associated with the contact data set. The communication may be established in the same or similar manner as described with reference to FIGS. 2–13 above.

Figure 16:
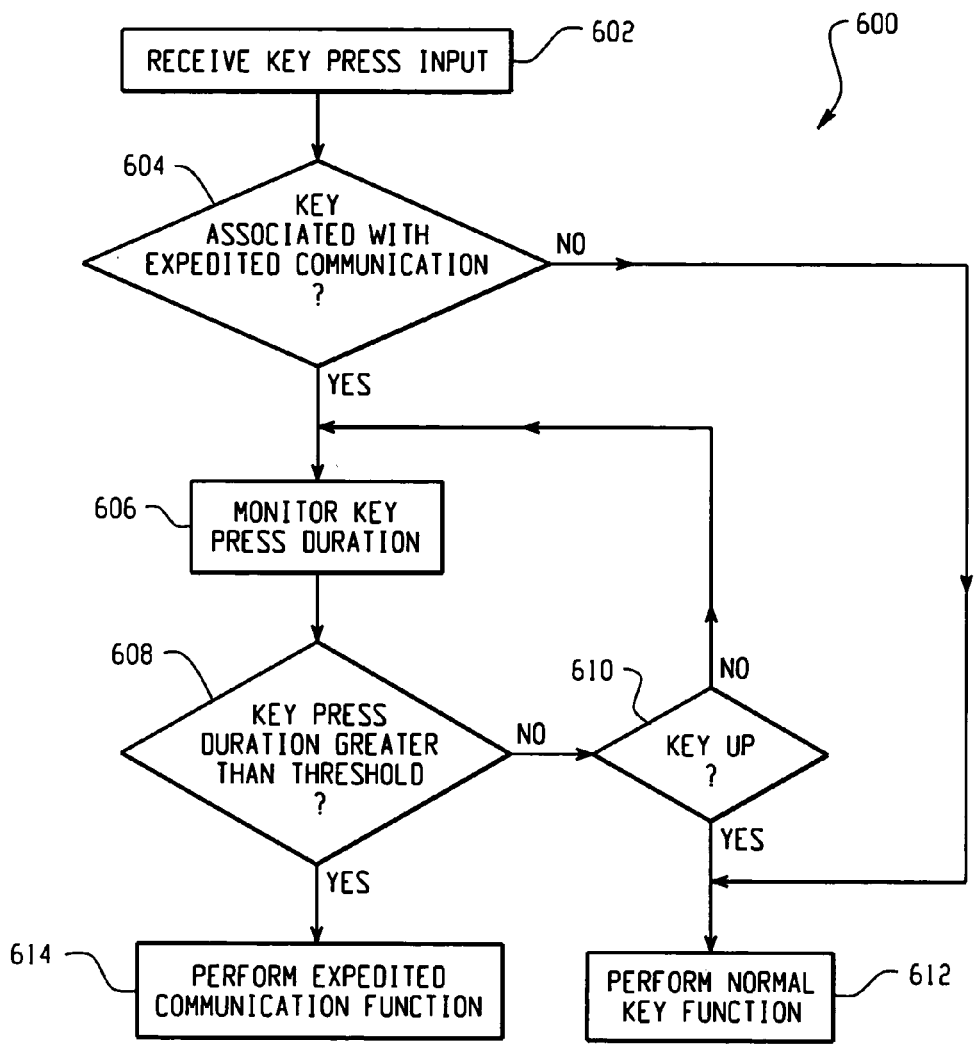
FIG. 16 is a flow diagram of a process for initiating an expedited communication function.

FIG. 16 is a flow diagram 600 illustration a process for initiating an expedited communication function. An expedited communication function is a communication function that is initiated by fewer user input operations than required to initiate the communication in a normal manner. For example, a one-key speed dial operation or a one-key initiation of an e-mail message may be considered expedited communication functions.

Step 602 receives a key press input. The key press input may be received from the pressing of a key on a physical keyboard or the pressing of a touch-sensitive area on a touch sensitive display. Other methods of key activation may also be used. For example, the key may be activated by a voice command if the mobile device is operable to process voice commands, such as "Press key H." Accordingly, the key press may be either a physical key press, a touch screen key press, or a voice activated key press.

Step 604 determines if the corresponding key is associated with an expedited communication function. If the corresponding key is not associated with an expedited communication function, then the normal key function is performed in step 612.

If, however, the corresponding key is associated with an expedited communication function, the step 606 monitors the duration of the key press. During the monitoring step, step 608 determines if the key press duration is greater than a threshold. The threshold is a time period that is long enough to distinguish between a normal key press and an intentional holding down of key, e.g., 1 second. The threshold may be modified by the user.

The key press may also be determined by a voice command if the mobile device is operable to process voice commands. For example, a voice-command capable mobile device may interpret a voice command "Press key H Hold" as a key press in which the key is held down long enough to distinguish between a normal key press and an intentional holding down of key, e.g., 1 second, or until the user utters the voice command "Release."

If the key press duration is not greater than the threshold, then step 610 determines if a key has been released. If the key has been released, then the normal key function is performed in step 612. If, however, the key has not been released, then steps 606 and 608 are repeated.

If step 608 determines that the key press duration is greater than the threshold, then step 614 performs an expedited communication function associated with the pressed key. The expedited communication function may be associated with a key and of the type as described with reference to FIGS. 2–7 above.

In another embodiment, pressing and holding down a key not associated with an expedited communication function for a duration greater than a defined threshold can cause the mobile device to prompt the user to assign an expedited communication function to the pressed key. For example, if the key L is presently not associated with an expedited communication function, pressing and holding down the key for a duration greater than a defined threshold will result in the mobile device prompting the user to associate the key with an expedited communication function at the expiration of the defined threshold.

There are situations in which the user may desire to hold down a key and not invoke an expedited communication function associated with the key. For example, a cell phone keyboard typically comprises an alphanumeric keypad having keys 0–9, a * key, and a # key. Keys 2–9 may also correspond to letters ABC, DEF, GHI, JKL, MNO, PQRS, TUV, and WXYZ, respectively. To enter text when composing an e-mail message or creating a phone book entry, a corresponding key is pressed and held down so that the text entry cycles through the corresponding letters. When the desired letter is displayed, the key is released and the letter is entered as text.

Accordingly, there are operating environments in which an expedited communication function associated with a keyboard key should be ignored, i.e., to facilitate multiple key functions in particular environments, the expedited communication function may be environment-dependent. An expedited communication function is environment-dependent if the function is invoked only when the key is pressed when the mobile device is in an expedited communication environment. For example, a text entry environment, such as when composing the body of an e-mail, as described above, may not be classified as an expedited communication environment because the user of the mobile device will not want to inadvertently invoke a speed dial call when entering text. Conversely, when the mobile device is in a standby mode, such as the state of a cell phone after activation, the user of the mobile device may intend to invoke a speed dial call by pressing a single key. Accordingly, such a mode may be classified as an expedited communication environment.

Figure 17:
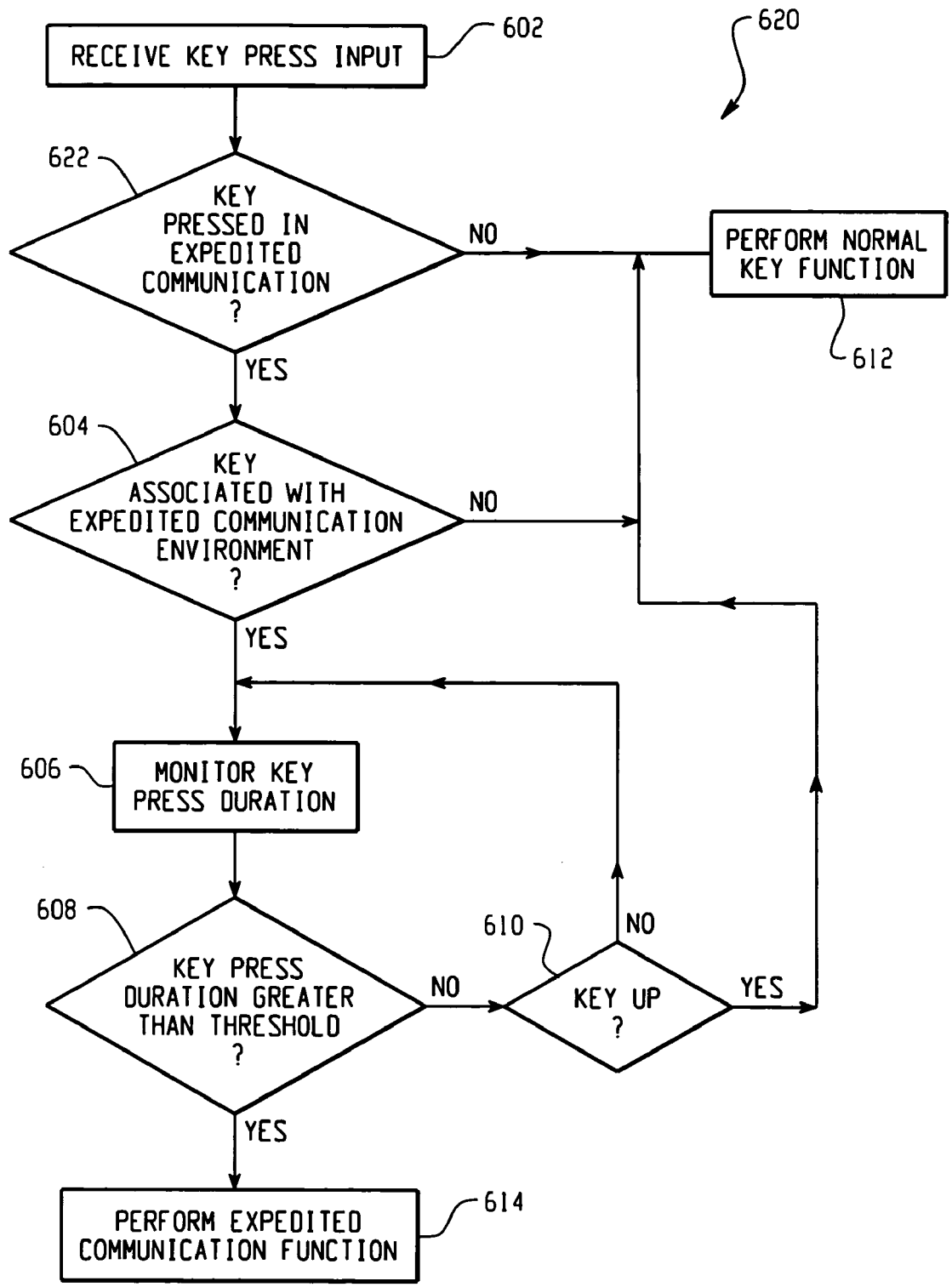
FIG. 17 is a flow diagram of a process for initiating an environment-dependent expedited communication function.

FIG. 17 is a flow diagram 620 illustrating a process for initiating an environment-dependent expedited communication function. Steps 602, 604, 606, 608, 610, 612 and 614 perform the same processes as steps 602, 604, 606, 608, 610, 612 and 614 of FIG. 16. However, before 604, 606, 608, 610, 612 and 614 are executed, an additional step 622 determines if the key is pressed in an expedited communication environment. If the key is not pressed in an expedited communication environment, such as when entering text in the body of an e-mail message, then step 612 performs the normal key function. If, however, the key is pressed in an expedited communication environment, then steps 604, 606, 608, 610, 612, and 614 are performed in a similar manner as described with respect to FIG. 16 above.

In another embodiment, once a communication function for either an expedited or non-expedited communication function is selected, a mode evaluation routine determines if the selected communication mode associated with the communication contact data is available. If the selected mode is available, then the communication function for the selected mode is executed. However, if the selected mode is not available, then an alternate communication mode may be selected.

Figure 18:
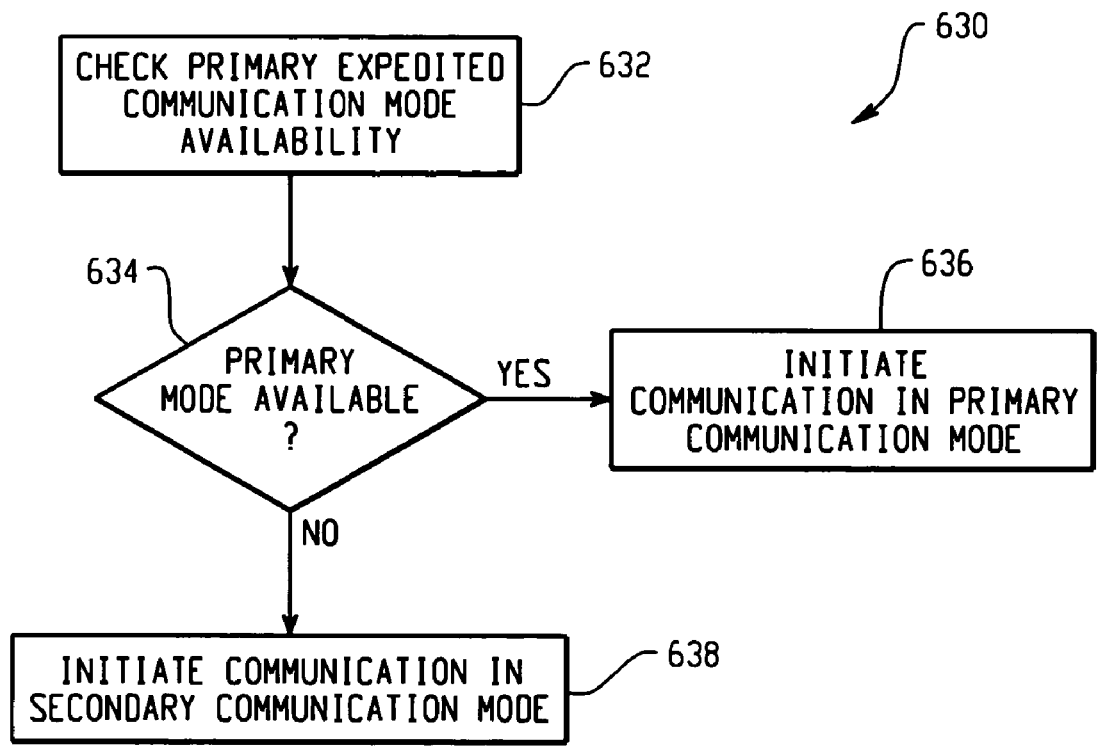
FIG. 18 is a flow diagram of a process for selecting between a primary communication mode and a secondary communication mode for a communication function.

FIG. 18 is a flow diagram 630 illustrating a process for selecting between a primary communication mode and a secondary communication mode for a communication function. If the primary communication mode associated with the communication contact data is available, then the corresponding communication function is executed.

In step 632, a primary communication mode is selected. Step 634 determines if the primary communication mode is available. For example, if a speed-dial function is invoked, the corresponding communication mode is a phone communication. Step 634 thus determines if voice coverage is available.

If step 634 determines that the selected communication mode is available, then step 636 initiates the selected communication in the primary communication mode. If, however, step 634 determines that the selected communication mode is not available, then step 638 initiates a communication to the contact according to a secondary mode.

For example, if voice coverage is available, then step 636 places a telephone call to the phone number. If voice coverage is not available, however, then step 638 may initiate a communication in a secondary communication mode by searching the contact data associated with the selected phone number for alternate communication contact data, e.g., an e-mail address from an address book entry corresponding to the phone number. If there is an e-mail address entry in the contact data, then an e-mail message to be sent to the e-mail address is created. The e-mail message may be a predefined message, or the body of the e-mail message may be composed by the user and sent manually.

Figure 19:
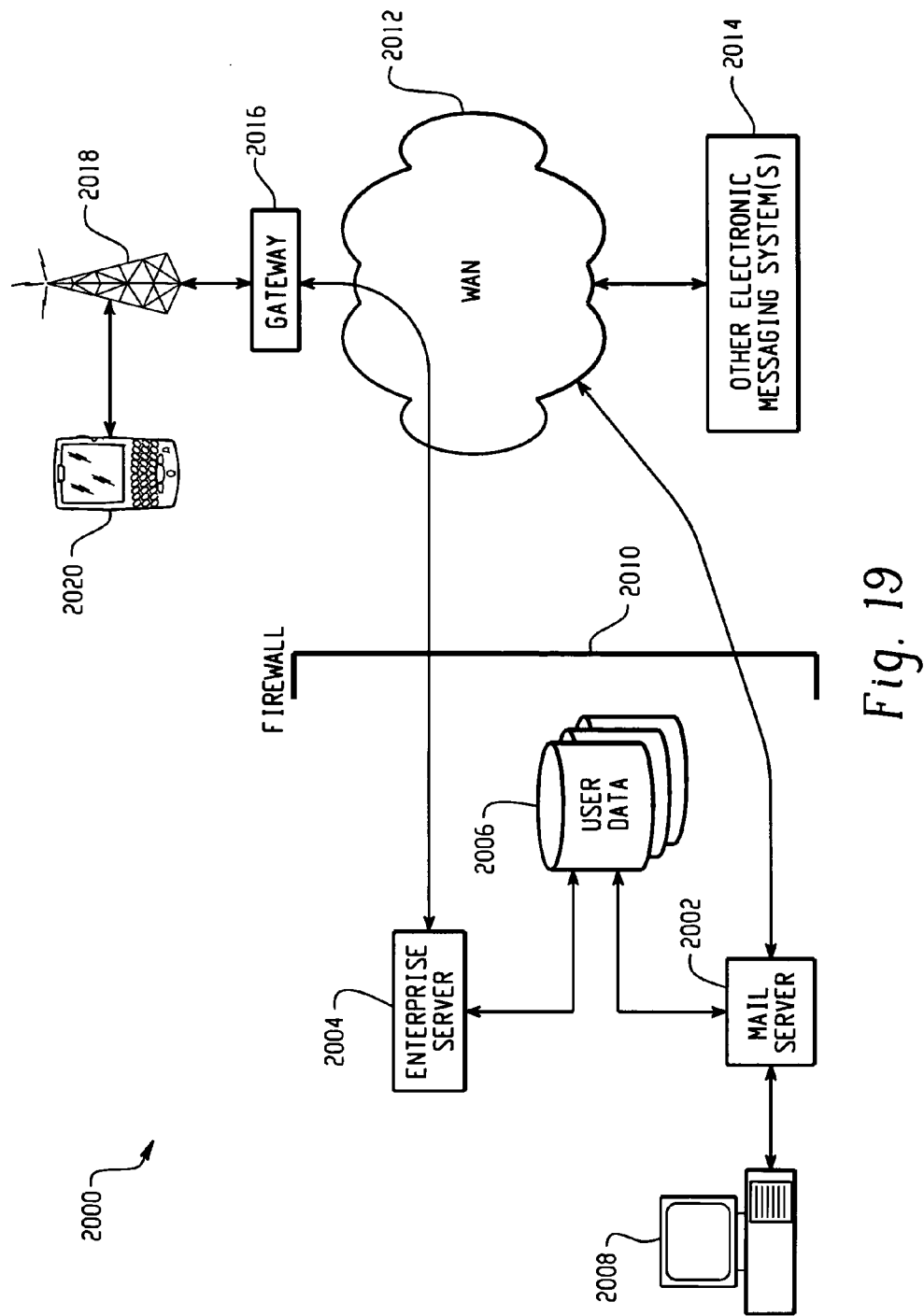
FIG. 19 is a block diagram of an example system for redirecting electronic messages to and from the mobile device.

FIG. 19 is a block diagram of an example system 2000 for redirecting electronic messages to and from a mobile device 2020. The mobile device 2020 may be the mobile device 100 of FIG. 1. The example redirection system 2000 includes an enterprise server 2004, a mail server 2002, a storage medium 2006 for electronic messaging (e.g., e-mail) account data, and a wireless gateway 2016. Also illustrated are the mobile communication device 2020, a wireless network 2018, a wide area network (WAN) 2012, a firewall 2010, a desktop client 2008, and one or more other electronic messaging systems 2014.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that execute electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic message addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the mobile communication device 2020 and to place messages sent from the mobile communication device 2020 into the electronic message account 2006 for delivery by the mail server 2002. The enterprise server 2004 stores mobile device information, such as a wireless identification (e.g., a PIN), used to communicate with the mobile communication device 2020. The enterprise server 2004 may, for example, communicate with the mobile communication device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary mobile device information are sent over the WAN 2012 to the wireless gateway 2016. For example, the enterprise server 2004 may encapsulate a copy of the message into one or more data packets along with a wireless identification (e.g., a PIN) for the mobile communication device 2020, and transmit the data packet(s) to the wireless gateway 2016 over a direct TCP/IP level connection. The wireless gateway 2016 may then use the wireless identification and/or other mobile device information to transmit the data packets(s) containing the electronic message over the wireless network 2018 to the mobile communication device 2020.

Electronic messages sent from the mobile communication device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the mobile communication device 2020. For instance, an electronic message to be redirected to the mobile communication device 2020 may be encrypted and compressed by the enterprise server 2004, and the encrypted message may then be encapsulated into one or more data packets for delivery to the mobile communication device 2020. To maintain security, the electronic message may remain encrypted over the entire communication path 2016, 2018, 2012 from the enterprise server 2004 to the mobile communication device 2020. Similarly, electronic messages sent from the mobile communication device 2020 may be encrypted and compressed by the mobile communication device 2020 before being packetized and transmitted to the enterprise server 2004, and may remain encrypted over the entire communication path 2016, 2018, 2012 from the mobile communication device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

Figure 20:
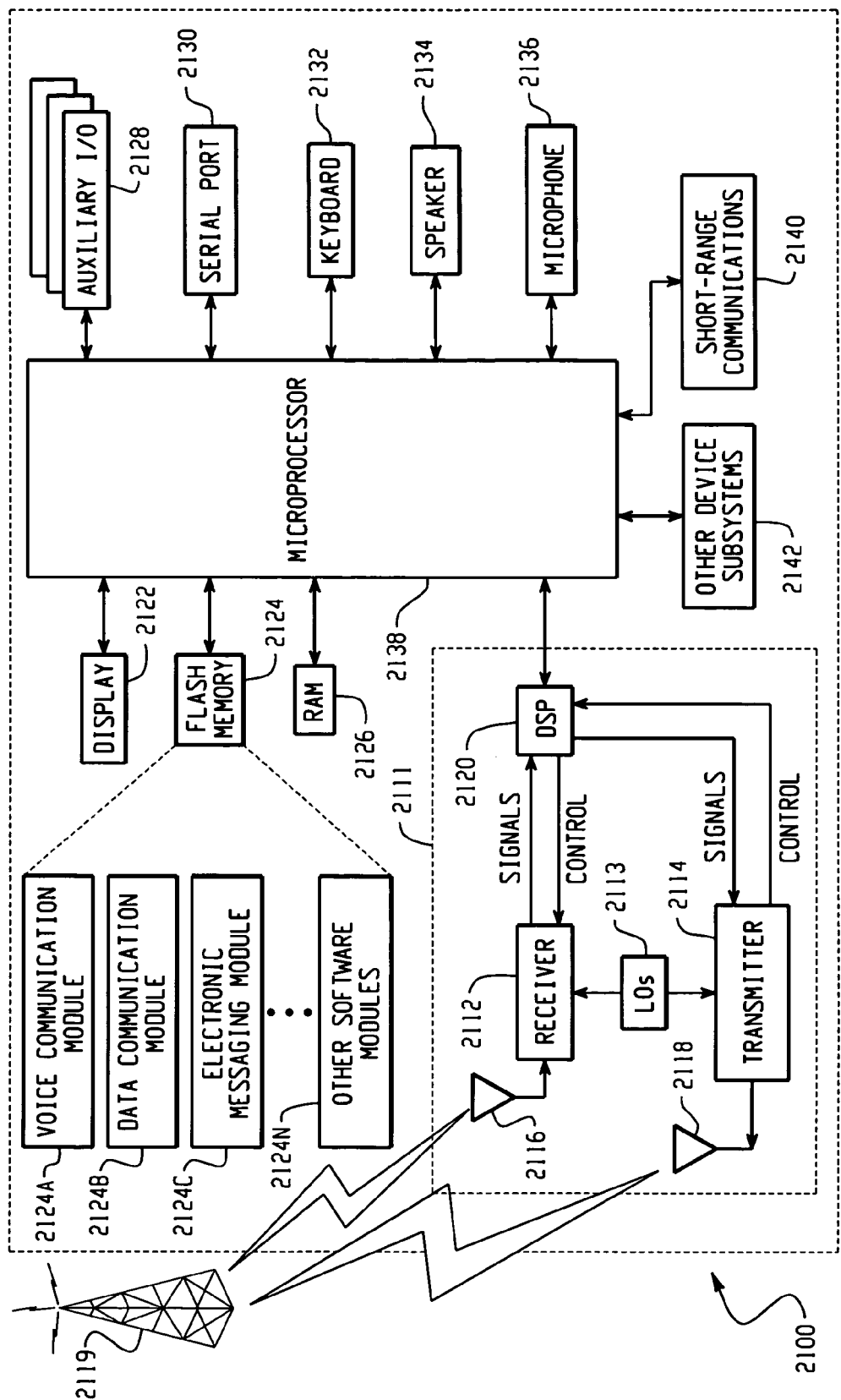
FIG. 20 is a more detailed block diagram of the mobile device of FIG. 1.

FIG. 20 is a more detailed block diagram of the mobile device 100 of FIG. 1. The mobile device 2100 includes a processing subsystem 2138, a communications subsystem 2111, a short-range communications subsystem 2140, a memory subsystem 2124, 2126, and various other. device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

The apparatus, methods, and flow diagrams described in this patent document may be implemented in the mobile devices described herein by mobile device program code comprising program instructions that are executable by the mobile device processing subsystem. Other implementations may also be used, however, such as firmware or even appropriately designed hardware configured to carry out the methods and flow diagrams described in this patent document. Additionally, the flow diagrams described in this patent document, which describe particular methods and/or corresponding acts in support of steps, may also be utilized to implement corresponding software structures and algorithms, and equivalents thereof.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A mobile device operable to initiate and receive communications over one or more wireless communication networks, the mobile device comprising:

a processing subsystem, a memory subsystem, a display subsystem, a communication subsystem, and a keyboard subsystem, the processing subsystem coupled to the memory subsystem, display subsystem, keyboard subsystem and communication subsystem, and operable to store and retrieve data in the memory subsystem, to execute instructions stored in the memory subsystem, receive input data from the keyboard subsystem, and to cause the communication subsystem to transmit and receive data over the communication network; and mobile device program code comprising program instructions executable by the processing subsystem and stored in the memory subsystem and upon execution cause the mobile device to display on the display subsystem a graphical user interface to facilitate the processing of expedited communication data, the graphical user interface comprising:

a graphical key representation of mobile device keyboard subsystem keys, the graphical key representation comprising a plurality of graphical keys arranged in similar disposition to the mobile device keyboard subsystem keys; and visual indicia to indicate mobile device keyboard subsystem keys associated with expedited communication functions, and the mobile device program code, upon execution cause the mobile device to:

receive user input and select one of the graphical keys displayed on the graphical user interface;

if the corresponding mobile device keyboard subsystem key of the selected graphical key is associated with an expedited communication function, display associated expedited communication data; and if the corresponding mobile device keyboard subsystem key of the selected graphical key is not associated with an expedited communication function, display a user input dialog for associating an expedited communication function with the corresponding mobile device keyboard subsystem key.

2. The mobile device of claim 1, wherein the visual indicia comprises shaded graphical keys associated with expedited communication functions.

3. The mobile device of claim 1, wherein the visual indicia comprises bolded graphical keys associated with expedited communication functions.

4. The mobile device of claim 1, wherein the expedited communication function comprises initiating a telephone call.

5. The mobile device of claim 1, wherein the expedited communication function comprises initiating an e-mail message.

6. A method for managing expedited communication functions for a mobile device having a processing subsystem, a memory subsystem, a display subsystem, a communication subsystem, and a keyboard subsystem, comprising:

displaying on the display subsystem a graphical key representation of mobile device keyboard subsystem keys, the graphical key representation comprising a plurality of graphical keys;

arranging the graphical keys in similar disposition to the mobile device keyboard subsystem keys;

displaying on the display subsystem visual indicia to indicate mobile device keyboard subsystem keys associated with expedited communication functions;

selecting one of the graphical keys displayed on the graphical user interface in response to the user input; and displaying a user input dialog for associating an expedited communication function with the corresponding mobile device keyboard subsystem key if the corresponding mobile device keyboard subsystem key of the selected graphical key is not associated with an expedited communication function.

7. The method of claim 6, wherein displaying on the display subsystem visual indicia to indicate mobile device keyboard subsystem keys associated with expedited communication functions comprises shading the graphical keys associated with expedited communication functions.

8. The method of claim 6, wherein displaying on the display subsystem visual indicia to indicate mobile device keyboard subsystem keys associated with expedited communication functions comprises bolding the graphical keys associated with expedited communication functions.

9. A mobile device operable to initiate and receive communications over one or more wireless communication networks, the mobile device comprising:
- a keyboard comprising a plurality of keys;
- means for displaying a graphical key representation of the keyboard keys and arranging a plurality of graphical keys in similar disposition to the keyboard keys, and for displaying visual indicia to indicate keyboard keys associated with expedited communication functions;
- means for selecting one of the graphical keys displayed in the graphical user interface in response to a user input; and
- means for displaying associated expedited communication data if the corresponding mobile device keyboard subsystem key of the selected graphical key is associated with an expedited communication function; and
- means for displaying a user input dialog for associating an expedited communication function with the corresponding mobile device keyboard subsystem key if the corresponding mobile device keyboard subsystem key of the selected graphical key is not associated with an expedited communication function.

10. The mobile device of claim 9, wherein the means for displaying a graphical key representation of the keyboard keys and arranging a plurality of graphical keys in similar disposition to the keyboard keys, and for displaying visual indicia to indicate keyboard keys associated with expedited communication functions comprises means for shading the graphical keys associated with expedited communication functions.

11. Mobile device executable software code stored in a machine readable medium, the mobile device executable software code comprising instructions that upon execution by a mobile device to cause the mobile device to:
- display on the display subsystem a graphical key representation of mobile device keyboard subsystem keys, the graphical key representation comprising a plurality of graphical keys;
- arrange the graphical keys in similar disposition to the mobile device keyboard subsystem keys;
- display on the display subsystem visual indicia to indicate mobile device keyboard subsystem keys associated with expedited communication functions;
- select one of the graphical keys displayed on the graphical user interface in response to a user input;
- if the corresponding mobile device keyboard subsystem key of the selected graphical key is associated with an expedited communication function, display associated expedited communication data; and
- if the corresponding mobile device keyboard subsystem key of the selected graphical key is not associated with an expedited communication function, display a user input dialog for associating an expedited communication function with the corresponding mobile device keyboard subsystem key.

12. A method for managing expedited communication functions for a mobile device having a processing subsystem, a memory subsystem, a display subsystem, a communication subsystem, and a keyboard subsystem comprising:
- displaying on the display subsystem a graphical key representation of mobile device keyboard subsystem keys, the graphical key representation comprising a plurality of graphical keys;
- arranging graphical keys in similar disposition to the mobile device keyboard subsystem keys;
- displaying on the display subsystem visual indicia to indicate mobile device keyboard subsystem keys associated with expedited communication functions;
- receiving a user input;
- selecting one of the graphical keys displayed on the graphic user interface in response to the user input;
- displaying associated expedited communication data if the corresponding mobile device keyboard subsystem key of the selected graphical key is associated with an expedited communication function; and
- displaying a user input dialog for associating an expedited communication function with the corresponding mobile device keyboard subsystem key if the corresponding mobile device keyboard subsystem key of the selected graphical key is not associated with an expedited communication function.

* * * * *